United States Patent [19]
Peponides et al.

[11] Patent Number: 5,854,808
[45] Date of Patent: Dec. 29, 1998

[54] METHODS AND APPARATUS FOR DETECTING THE PRESENCE OF A PRESCRIBED SIGNAL IN A CHANNEL OF A COMMUNICATIONS SYSTEM

[75] Inventors: George Peponides, Encinitas, Calif.; Kumar Balachandran, Cary, N.C.

[73] Assignee: Pacific Communication Sciences, San Diego, Calif.

[21] Appl. No.: 614,327

[22] Filed: Mar. 12, 1996

Related U.S. Application Data

[63] Continuation-in-part of Ser. No. 121,339, Sep. 14, 1993, Pat. No. 5,574,750.

[51] Int. Cl.⁶ .................................................. H04B 17/00
[52] U.S. Cl. .................... 375/224; 370/241; 370/252; 370/527; 370/529; 455/434; 455/466
[58] Field of Search ........................... 375/224; 370/241, 370/252, 527, 529; 455/434, 466

[56] References Cited

U.S. PATENT DOCUMENTS

| | | | |
|---|---|---|---|
| Re. 34,034 | 8/1992 | O'Sullivan | 379/59 |
| 3,927,259 | 12/1975 | Brown | 179/1 |
| 3,927,260 | 12/1975 | Amundson et al. | 179/1 |
| 4,141,072 | 2/1979 | Perreault | 364/553 |
| 4,189,677 | 2/1980 | Cooper et al. | 325/321 |
| 4,222,115 | 9/1980 | Cooper et al. | 375/1 |
| 4,763,322 | 8/1988 | Eizenhofer | 370/95 |
| 4,797,931 | 1/1989 | Furukawa et al. | 351/56 |
| 4,799,252 | 1/1989 | Eizenhoffer et al. | 379/59 |
| 4,941,155 | 7/1990 | Chuang et al. | 375/84 |
| 4,943,973 | 7/1990 | Werner | 375/1 |
| 4,984,247 | 1/1991 | Kaufmann et al. | 375/1 |
| 5,020,076 | 5/1991 | Cahill et al. | 375/5 |
| 5,047,772 | 9/1991 | Ribner | 341/156 |
| 5,056,109 | 10/1991 | Gilhousen et al. | 375/1 |
| 5,058,134 | 10/1991 | Chevillat et al. | 375/39 |
| 5,065,411 | 11/1991 | Muto | 375/100 |
| 5,073,900 | 12/1991 | Malinckrodt | 375/1 |
| 5,084,891 | 1/1992 | Ariyavisitakul et al. | 371/42 |
| 5,088,108 | 2/1992 | Uddenfeldt et al. | 375/12 |
| 5,093,840 | 3/1992 | Schilling | 375/1 |
| 5,097,507 | 3/1992 | Zinser et al. | 381/31 |
| 5,103,459 | 4/1992 | Gilhousen et al. | 375/1 |
| 5,109,390 | 4/1992 | Gilhousen et al. | 375/1 |
| 5,109,528 | 4/1992 | Uddenfeldt | 455/33.2 |
| 5,150,377 | 9/1992 | Vannucci | 375/1 |
| 5,157,661 | 10/1992 | Kanai et al. | 370/95.1 |
| 5,159,624 | 10/1992 | Makita | 379/57 |
| 5,184,347 | 2/1993 | Farwell et al. | 370/94.1 |
| 5,187,719 | 2/1993 | Birgenheier et al. | 375/10 |
| 5,195,090 | 3/1993 | Bolliger et al. | 370/94.1 |
| 5,195,091 | 3/1993 | Farwell et al. | 370/94.1 |
| 5,203,024 | 4/1993 | Yamao | 455/133 |
| 5,206,882 | 4/1993 | Schloemer | 375/1 |
| 5,353,307 | 10/1994 | Lester et al. | 375/14 |
| 5,383,225 | 1/1995 | Aguirre et al. | 375/106 |
| 5,574,750 | 11/1996 | Peponides et al. | 375/224 |

OTHER PUBLICATIONS

TIA/EIA Interim Standard, "800 MHz TDMA Cellular –Radio Interface –Mobile Station –Base Station Compatibility –Traffic Channels and FSK Control Channel", Telecommunications Industry Association, Washington, DC, 1994.

*Primary Examiner*—Stephen Chin
*Assistant Examiner*—Jeffrey W. Gluck
*Attorney, Agent, or Firm*—Woodcock, Washburn, Kurtz, Mackiewicz & Norris; McDermott, Will & Emery; Steven A. Shaw

[57] ABSTRACT

Methods and apparatus for detecting the presence of a particular signal among all the channels of interest in a cellular or similar type system are disclosed. A first method detects CDPD signals, and a second method detects DQPSK signals used in digital control channels in accordance with the IS-136 standard. These methods include the steps of sampling a received signal in at least one channel to obtain a predetermined number of samples for the at least one channel; computing an error value for each sample; determining a minimum error value; determining a ratio of the minimum error value to a reference value; and making a decision as to whether the received signal is the prescribed signal on the basis of at least the ratio, wherein the decision is made by comparing the ratio to a threshold value.

30 Claims, 8 Drawing Sheets

EVEN SAMPLES

ODD SAMPLES

METHODS AND APPARATUS FOR DETECTING THE PRESENCE OF A PRESCRIBED SIGNAL IN A CHANNEL OF A COMMUNICATIONS SYSTEM

CROSS-REFERENCE TO RELATED APPLICATION

This is a continuation-in-part of U.S. patent application Ser. No. 08/121,339, filed Sep. 14, 1993, now U.S. Pat. No. 5,574,750 entitled "Methods and Apparatus for Detecting Cellular Digital Packet Data (CDPD)."

FIELD OF THE INVENTION

The present invention relates generally to methods and apparatus for detecting the presence of a specific kind of carrier in a cellular channel. A first embodiment of the invention, which is also disclosed in copending U.S. patent application Ser. No. 08/121,339, detects the presence of Cellular Digital Packet Data (CDPD) signals, and a second embodiment detects the presence of DQPSK signals, the latter being employed as IS-136 digital control channel signals, as described below.

BACKGROUND OF THE INVENTION

Background information relating to CDPD is disclosed in U.S. patent application Ser. No. 08/121,339, which is hereby incorporated by reference. The following discussion relates to the IS-136 digital control channel.

In December 1994, the IS-136 standard was adopted by the Telecommunications Industry Association (TIA). The IS-136 standard is designed to enhance the capabilities and features of dual-mode cellular phones based on IS-54 (the TDMA North American Digital Cellular standard). The major feature of IS-136 is the addition of a digital control channel (utilizing $\pi/4$ DQPSK, i.e., $\pi/4$-shifted Digital Quaternary Phase Shift Keying) that enables a much longer standby time in the subscriber equipment (mobile unit) and a set of services in addition to standard cellular telephony, such as Short Messaging Service (SMS), group addressing and alerting, and support of private (typically PBX) and residential operation in conjunction with the public cellular operation. As used herein, the term "DQPSK" refers to both DQPSK and $\pi/4$ DQPSK, unless the context clearly indicates otherwise.

Finding a control channel is the first task of the subscriber unit upon power-on. It is generally highly desirable to identify and access a control channel as soon as possible, since doing so allows the unit to receive service from the system and to accept and originate calls and messages. However, unlike the analog control channels in the AMPS and similar systems, the new digital control channels defined in IS-136 do not have preassigned frequencies, but instead they can populate any channel in the frequency band of operation. As a result, a more sophisticated method for finding and accessing a digital control channel is required.

In addition to the fact that the frequency of the control channels is not known a priori to the subscriber unit, an additional complication arises because the band of operation may be occupied by many different kinds of channels, such as analog voice channels, digital traffic channels, analog control channels or CDPD channels. Thus, the task of the subscriber unit is made even more difficult since merely looking for the presence of energy using the RSS (received signal strength) on a channel simply determines the presence of an active transmission on that channel but says nothing regarding the nature of the channel. The second embodiment of the present invention disclosed herein solves exactly this problem. That is, it provides a method by which the subscriber unit can determine with a high degree of confidence that the signal being received is, or is not, a signal with the desired modulation type and rate. Thus, in so doing, it quickly narrows the search to the channels that contain the right modulation type, i.e., the channels that carry digital traffic or digital control signals. Finding a digital traffic channel is quite beneficial in the search for a digital control channel since, as described below, digital traffic channels contain a locator field that aids in the search for a digital control channel.

The IS-136 specification deals with this problem through the introduction of locator messages and fields. Specifically, a new message has been introduced in the analog control channel that points to the channel number on which the digital control channel in that cell resides. In addition, the digital traffic channel contains a locator field as part of each TDMA slot in the forward DTC (the digital channel carrying traffic from a cell site to a subscriber unit) that points to a set of eight candidate channels for the digital control channel, thus acting as a partial locator for this channel.

The recommended way to acquire a digital control channel in IS-136 is as follows: First the subscriber unit scans the set of channels on which the analog control channels must reside, and ranks these channels by RSSI. Then it receives the analog control channel with the highest RSSI, decodes the forward control channel data, and searches for the message that locates the digital control channel. This message is guaranteed to be repeated every 5 seconds, maximum, if the cell supports digital control channels at all. The unit then moves to the set of channels pointed to by the locator message and tries to lock onto the digital control channel.

This method of finding the control channel has a number of shortcomings. For example, it cannot be used in cases where there are no analog control channels with known a priori frequency assignments. Such cases can arise when (a) the system is purely digital, as opposed to the analog/digital systems that are deployed during the present transitional period, and (b) the system has both analog and digital traffic channels but only digital control channels. The latter case can arise because the digital control channel was designed with many desirable, modern features, such as sleep mode and other user services, and analog voice channels can be desirable in some cases due to better transparency to non-voice audio band signals (modem, music, acoustic noise, etc.), and reduced computational requirements and dissipated power, features that can be attractive in situations such as residential or private use. In addition, the time it takes to find a digital control channel can be long since the subscriber unit must first find an analog control channel, then wait until it receives the digital channel locator message (which could require as much as 5 seconds), and then switch to the digital control channel. The unit may be in an area in which it can communicate only with a single cell, and the analog control channel may happen to be poorly received (e.g., in a "fade") by the unit, in which case service will not be established at all. As described below, the present invention searches for digital control and traffic channels (e.g., channels carrying DQPSK signals). This is advantageous since the probability that multiple channels are in a fade is much smaller than the probability that a single channel is in a fade.

A brief discussion of DQPSK will now be provided as further background information.

FIGS. 1A and 1B illustrate exemplary $\pi/4$ DQPSK signals. In the presently preferred embodiments of the present invention, odd-numbered symbols ($a_k$, $b_k$, $c_k$, $d_k$, depicted in FIG. 1B) are offset in phase from the corresponding even numbered-symbols ($a_k$, $b_k$, $c_k$, $d_k$, depicted in FIG. 1A) by $\pi/4$, or 45°. As shown, all of the symbols ideally lie on a circle of radius "R", which represents the magnitude of the symbols.

FIG. 2 illustrates the conversion of a four-bit binary sequence to a sequence of two quaternary symbols ($c_k$, $b_k$) by a DQPSK modulator. This conversion is typically performed to reduce the required transmission bandwidth. As shown, four bits $B_1$ through $B_4$, each having a pulse width of 1/R seconds, arbitrarily assigned the respective values "1001", are converted to the sequence, $c_k = -\cos\omega_c t$, $b_k = \sin\omega_c t$, where each symbol has a width of T=2/R seconds. Thus, with DQPSK, binary bit pairs are converted to high frequency sine waves having four possible phases equally spaced around the circle of radius R. The illustrative symbols in FIGS. 1A and 1B are defined generally by, $$s_i(t) = \cos(\omega_c t + \theta_i) - T/2 \leq t \leq T/2, \ i=1, 2, 3, 4$$

where $\omega_c$ is the carrier frequency, and the symbols $a_k$ through $d_k$ correspond to $s_1(t)$ through $s_4(t)$, respectively. In FIG. 1A, the $\theta_i = 0, -\pi/2, \pi$ and $\pi/2$, respectively, whereas in FIG. 1B the $\theta_i = \pi/4, -\pi/4, -3\pi/4$ and $3\pi/4$, respectively.

FIG. 3 schematically depicts an exemplary DQPSK modulator. As shown, binary inputs are provided at a rate of R bits/second on an input line 21 of a block 22. Block 22 stores two bits at a time and provides R/2 quaternary symbols/second via one of two switches 23a or 23b to a mixer 24a or 24b. By properly generating the pulses $\cos\omega_c t$ and $\sin\omega_c t$ ($-T/2 \leq t \leq T/2$), and combining these pulses with a summing device 26, DQPSK symbols are generated at a rate of R/2 symbols per second on an output line 27.

FIG. 4 schematically depicts a DQPSK demodulator. A DQPSK input is received on a line 41 and fed to a pair of downconversion mixers 42a and 42b. A mixing signal $\cos\omega_c t$ is provided to mixer 42a and to a phase shifter 43, and the phase shifter provides a second mixing signal $\cos(\omega_c t + \pi/2) = \sin\omega_c t$ to mixer 42b. The outputs of the respective mixers are filtered by low pass filters 46a and 46b, and the filtered outputs are provided to a comparator 47. The comparator 47 reconstructs the original binary baseband sequence and provides a binary output, at a rate of R bits per second, on line 48.

SUMMARY OF THE INVENTION

A primary object of the present invention is to provide methods and apparatus for detecting the presence of a particular signal among all the channels of interest in a cellular or similar type system. This specification describes a first method, the "MMSE-CDPD method," for detecting CDPD signals, and a second method, the "MMSE-DQPSK method," for detecting DQPSK signals used in digital control channels in accordance with the IS-136 standard.

The presently preferred embodiments of both methods employ a minimum mean-squared error (MMSE) measurement. These methods are distinguished from the spectral estimation method disclosed in U.S. patent application Ser. No. 08/121,339, and now claimed in copending U.S. patent application Ser. No. 08/424,706, filed Apr. 18, 1995, entitled "Methods and Apparatus for Detecting Cellular Digital Packet Data (CDPD)" (which is a divisional application of Ser. No. 08/121,339). The spectral estimation method involves "shortlisting" the number of channels scanned to a smaller number of occupied channels, synchronizing to the signal, collecting enough bits to form and decode a word to make a determination of the signal type, all of which can require a large amount time. The MMSE-CDPD method provides a suitable alternative to the spectral estimation method for identifying CDPD signals. In contrast, the MMSE-DQPSK method identifies IS-136 digital control channels.

The presently preferred embodiments of the MMSE-CDPD and MMSE-DQPSK methods comprise the steps of sampling a received signal in at least one channel to obtain a predetermined number of sampling sequences for the at least one channel; computing an error value for each sampling sequence, each error value based on differences, if any, between each sample value of the sampling sequence and a predetermined value; determining a minimum error value; comparing a function of the minimum error value to a reference value; and making a decision as to whether the received signal is the prescribed signal on the basis of the comparison. (As used herein, the expression, "function of the minimum error value" refers to and encompasses the minimum error value itself, a normalized version of the minimum error value, or some other value related to the minimum error value by a known function.) In preferred embodiments, the decision is made by comparing a ratio (e.g., a normalized version of the minimum error value) to a threshold. value.

In the MMSE-DQPSK method, the prescribed signal is preferably a DQPSK signal, and the error values are mean-squared error (MSE) values. Further, in preferred embodiments, a first of the MSE values ($MSE_1$) is computed over a plurality of symbols with respect to a first sample of each of the symbols, a second of the MSE values ($MSE_2$) is computed over the plurality of symbols with respect to a second sample of each of the symbols, a third of the MSE values ($MSE_3$) is computed over the plurality of symbols with respect to a third sample of each of the symbols, and a fourth of the MSE values ($MSE_4$) is computed over the plurality of symbols with respect to a fourth sample of each of the symbols.

In yet another embodiment, the present invention provides a mobile cellular subscriber unit comprising an identification block for detecting or identifying an IS-136 digital channel carrying DQPSK signals. The identification block comprises means for obtaining a predetermined number of samples of a received signal in at least one channel, estimating a match parameter indicative of a Noise-to-Signal (NSR) ratio, and making a decision as to whether the received signal is a DQPSK signal on the basis of the NSR.

Other features of the invention are described below.

BRIEF DESCRIPTION OF THE DRAWINGS

FIG. 6A depicts a typical demodulated signal; FIG. 6B depicts a waveform and four contributions to the MSE; FIG. 6C schematically depicts a processor for performing CDPD signal detection; and FIG. 6D is a flowchart of the method.

DETAILED DESCRIPTION OF PREFERRED EMBODIMENTS

Figure 5:
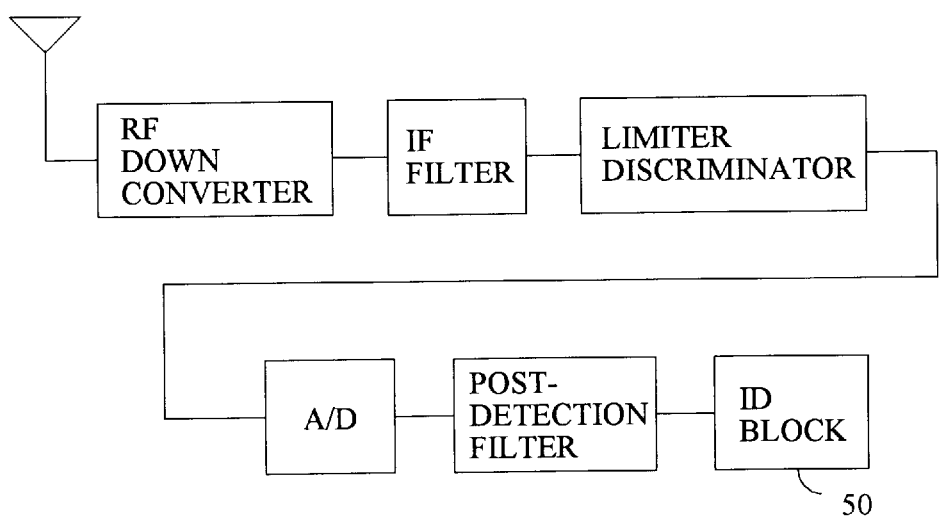
FIG. 5 is a block diagram of the receiver of a mobile cellular telephone unit.

FIG. 5 is a block diagram of the receiver of a mobile subscriber unit. As shown, the mobile unit comprises an RF (radio frequency) converter, IF (intermediate frequency) filter, limiter-discriminator, analog-to-digital (A/D) convertor, post-detection filter, and identification block 50. According to the present invention, the identification block 50 comprises means for detecting a CDPD or DQPSK signal in accordance with one of the two methods described below. The components of the mobile unit, with the exception of the identification block 50, are generally well known to those skilled in the art and thus are described herein only to the extent necessary to explain the present invention.

A. Identification of CDPD Signals

The CDPD identification problem may be formulated as a hypothesis testing problem:

$H_0$: The channel is occupied by CDPD,
$H_1$: The channel is not occupied by CDPD,
$H_{1a}$: The channel is a voice channel,
$H_{1b}$: The channel is a control channel.

The CDPD signal is unique in having a fixed pulse shape and symbol time. The MMSE-CDPD method for detecting this signal may be applied either recursively or through a block-processing technique.

The signal detection problem may be formulated as a hypothesis testing problem stated as the binary hypothesis test:

$$H_0: r(t) = n(t) \quad (1a)$$

$$H_1: r(t) = F[s(t)] + n(t) \quad (1b)$$

The signal s(t) is a GMSK signal of the form:

$$s(t) = \sqrt{\frac{2E}{T}} \cos\left[2\pi f_c t + 2\pi h \sum_{-\infty}^{\infty} \alpha_i \int_{-\infty}^{t} g(\tau - iT) d\tau \right] \quad (2)$$

with the frequency pulse:

$$g(t) = \frac{1}{2T}\left[Q\left(2\pi BT\left(\frac{t/T - 1/2}{\sqrt{\ln 2}}\right)\right) - Q\left(2\pi BT\left(\frac{t/T + 1/2}{\sqrt{\ln 2}}\right)\right)\right] \quad (3)$$

where T represents the symbol time, E represents the energy per symbol interval, h=0.5 is the modulation index, and the product BT is set to 0.5. The frequency pulse g(t) has been normalized so that the phase response q(t) satisfies conventions followed in the representation of Continuous Phase Modulation Signals.

$$q(t) = \int_{-\infty}^{t} g(\tau) d\tau = 0.5, \quad t \to \infty \quad (4)$$

Although the frequency pulse g(t) has infinite length (support), implementations commonly truncate the GMSK filter to three or four symbol intervals. The non-causality of g(t) is converted into a delay of two symbol intervals. The received signal may be noise n(t) or a combination of signal s(t) and noise. Since there is a possibility that the signal is transmitted or received by a mobile unit, the operator F represents Rayleigh fading and other channel impairments such as dispersion. The technique is analyzed in additive white Gaussian noise channels or Rayleigh faded channels, since it should work in stationary and mobile environments.

In one embodiment, the demodulator is assumed to be a limiter-discriminator (FIG. 5) and the demodulated signal is modeled at baseband as in the following equation:

$$\frac{\dot{Q}I - I\dot{Q}}{I^2 + Q^2} = \left\{ \frac{(I + jQ)(\dot{Q} + j\dot{I})}{I^2 + Q^2} \right\} \quad (5)$$

with the IF filter being a four pole Butterworth filter with cutoff at 15 kHz from the carrier. Final signal processing is performed using samples at 76.8 kHz, which amounts to four samples per CDPD symbol interval. The post-detection filter in one preferred embodiment is a twelve tap FIR filter at a 76.8 kHz sampling rate with a cutoff of 9.6 kHz. This filter is roughly matched to the spectrum of the GMSK frequency pulse.

Figure 6A:
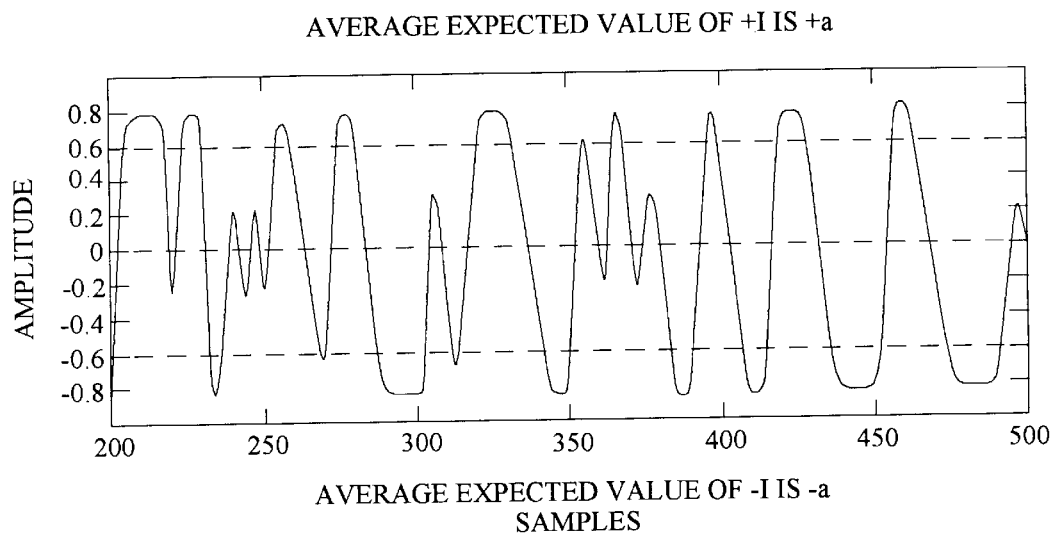
FIGS. 6A–6D illustrate the MMSE-CDPD processing technique for detecting CDPD signals.
Figure 6B:
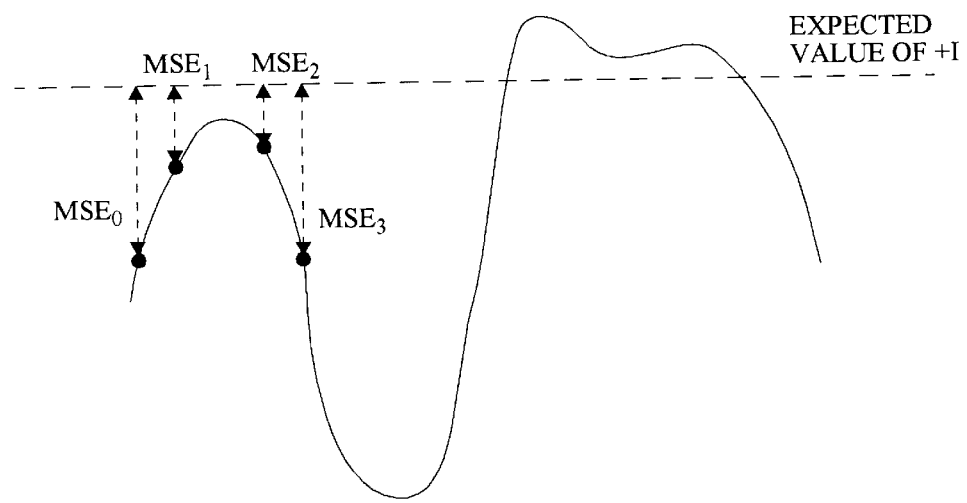
Figure 6C:
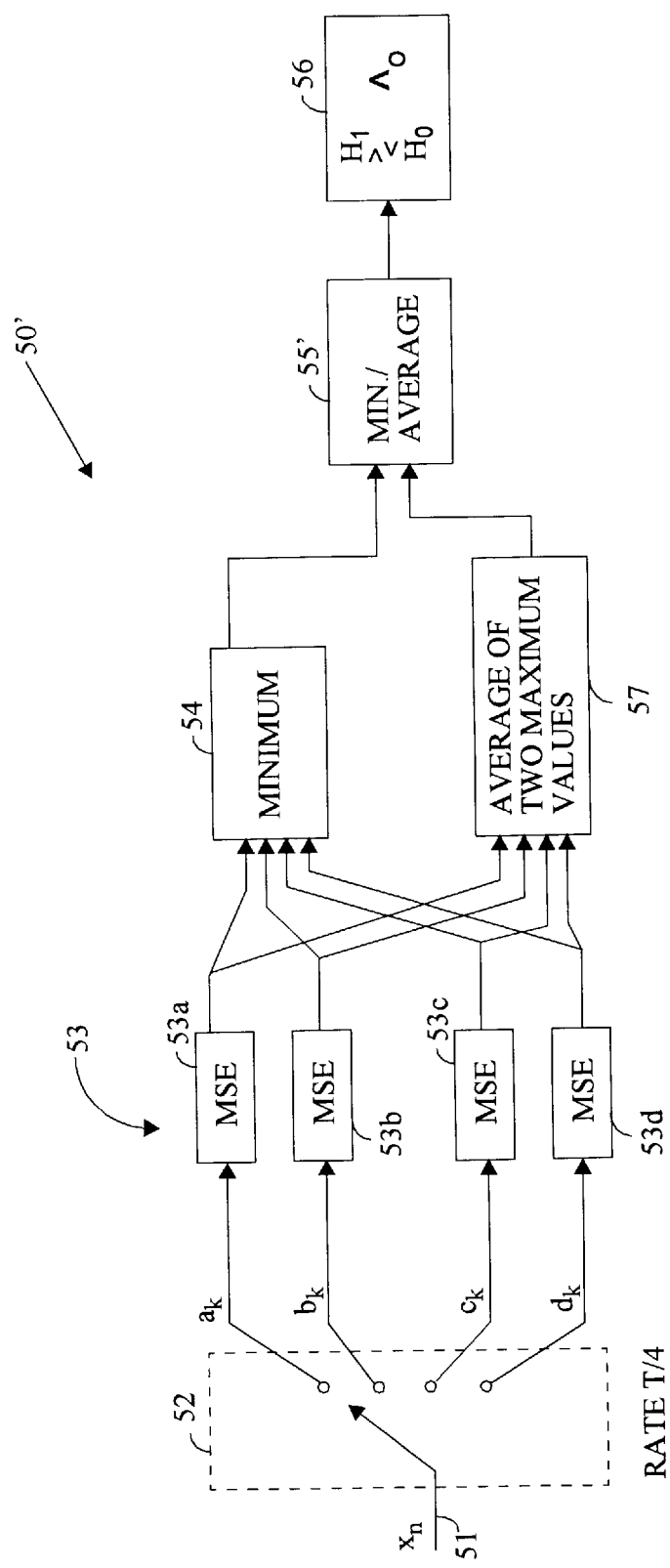

FIGS. 6A–6D are referred to below in explaining the MMSE-CDPD processing technique. FIG. 6A depicts a typical demodulated signal, where the 10 dB point of the post-detection filter (FIG. 5) is 9.6 kHz. FIG. 6B depicts a waveform and the difference (error) between the received signal and the expected value for the four samples in a given symbol. FIG. 6C schematically depicts the processing performed by the identification block 50 (FIG. 5). As shown in FIG. 6C, the CDPD identification block includes a T/4 demultiplexing block 52, which outputs signals $a_k, b_k, c_k, d_k$. These signals are simply the result of demultiplexing the stream of samples that are obtained by sampling the analog signal at four times per symbol period. That is, the output of the limiter discriminator is sampled at the rate of 4 samples per symbol period, the samples are filtered using the post detection filter, and then the samples are split into four separate sets before the rest of the processing takes place.

The signals $a_k, b_k, c_k, d_k$ are fed to corresponding MSE (mean-squared error) computation blocks 53 (e.g., blocks 53a–53d). The outputs of the MSE computation blocks 53 are provided to a block 54 for determining the minimum MSE and a block 57 for determining the average of the two maximum MSEs. The ratio of the minimum MSE to the average of the two maximum MSEs is determined by block 55'. The output of block 55' is provided to decision block 56, which decides which hypothesis is true, $H_1$ or $H_0$. Block 55' takes as inputs the minimum MSE and the average of the two maximum MSEs and forms the ratio of the two quantities. The decision block 56 compares this ratio (also known as decision variable, denoted by $H_0$ in block 56) to a threshold and decides in favor of one hypothesis or the other in accordance with the outcome of this comparison.

The peak level of the signal at optimum timing is assumed to be ±a. This embodiment of the invention makes a decision on each sample of the output of the post-detection filter. The decision is then used to calculate the mean-squared error with respect to an expected signal level. Hypothesis $H_0$ is declared if the minimum of the four MSEs is below a chosen threshold. Before making a decision, the calculated MSE is normalized by the average of the two maximum MSE values. The result of this method has been compared with the unnormalized metric, as well as another technique that used the average of the three maximum MSE values as a normalization factor. The present method yielded faster convergence of results than both of the others. A probable cause for the improvement is illustrated in FIG. 6B. Since two samples within a symbol interval may be close to the optimum sampling point, the contributions to the mean-squared error due to those two points may be close. Thus, inclusion of one of those points in the normalization factor adversely affects the discrimination ability of the method.

Results have been obtained for processing intervals of 2.6 ms and 5.2 ms. The longer processing interval could be used for confirmation of coarse results from a quick pass over all channels of interest with a smaller processing interval. However, there is seen to be a marginal improvement in results at low signal-to-noise ratios, and it may be worth scanning through the whole set again using 2.6 ms of data. A maximum of three passes will increase the probability of detection from 95% to 99.98%. Assume the total number of channels that the mobile end station scans over is 1000. One pass will take a maximum of 2.6 s. Table 1 gives a list of probabilities for interesting events. A nominal probability of detection for one pass over the set of channels is chosen to be 0.95. The simplified scenario in the table does not consider the possibility of false-alarm. The implemented scheme would preferably make a pass over the set of channels, short-listing candidates in the process. A second pass over the short-listed candidates is not expected to add more than 1 second to the processing time, under worst case channel conditions.

TABLE 1

A list of interesting events and corresponding probabilities of detection.

| EVENT | PROBABILITY |
| --- | --- |
| One pass succeeds | 0.9500 |
| One of three passes succeeds | 0.9998 |
| Detection time < 2.6 s | 0.9500 |
| Detection time < 5.2 s | 0.9975 |
| Detection time < 7.8 s | 0.9998 |

The expected signal value is dependent on the implementation of the limiter-discriminator (FIG. 5). It is recommended that automatic calibration of the scheme be implemented. This calibration could be dynamically done, and the mobile end-station (or base station) could recalibrate whenever the system registers on a CDPD channel.

There are two parameters that should be optimized for fine tuning the signal processor. One of them is the bandwidth of the post-detection filter (FIG. 5). This need not be identical to the filter actually used during reception. A wider bandwidth will yield less intersymbol interference but will allow more noise at the filter's output. However, since the expected signal value in no noise conditions depends on the amount of intersymbol interference, a slightly wider bandwidth will probably be more effective. The other parameter that needs tuning is the expected signal level ±a. The optimum value of a will be the average peak sample value at the 76.8 kHz rate. For the particular implementation disclosed herein, the value chosen was 0.6. This value will change depending on the implementation.

The threshold choice for a first pass will preferably allow a 20–30% false alarm probability. Such a choice will yield detection probabilities in excess of 98% at all SNR's of interest. On the second pass, the false alarm rate may be greatly reduced.

Figure 6D:
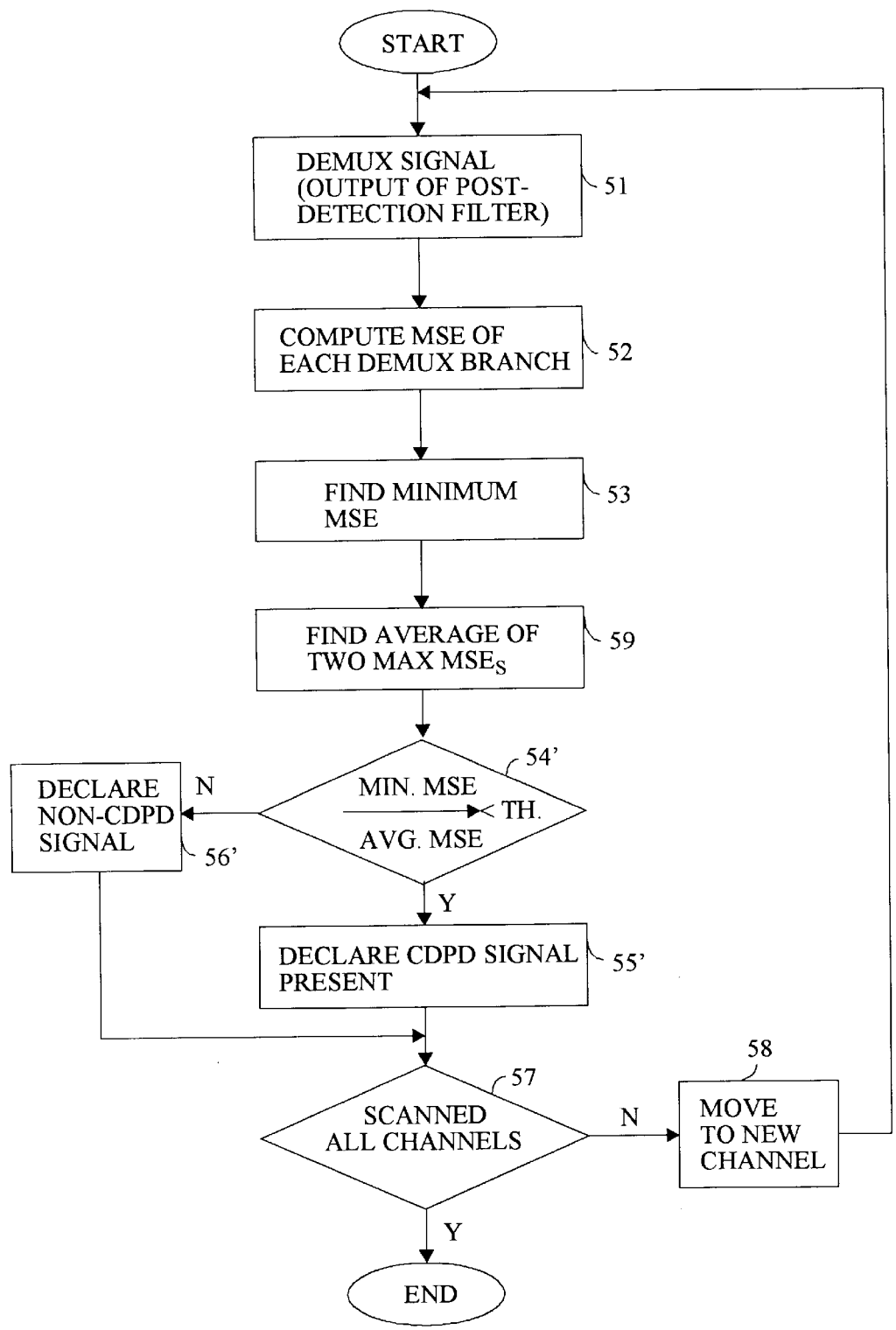

This method for detecting CDPD signals will now be summarized with reference FIG. 6D. The method begins by demultiplexing the signal output of the post-detection filter 50 (see FIG. 5). This step is referred to as step S1. Thereafter, the MSE of each demultiplexer branch (see FIG. 6C) is computed (step S2). The minimum MSE is then found (step S3), and then the average of the two maximum MSEs is found (step S9). The ratio of the minimum MSE to the average of the two maximum MSEs is then compared to a threshold (step S4'). If the ratio is not greater than the threshold, the signal is declared a non-CDPD signal (step S6'). If the ratio is greater than the threshold, the signal is declared a CDPD signal (step S5'). Finally, all channels are preferably scanned (steps S7 and S8).

B. Identification of IS-136 DCC or DQPSK Signals

Figure 7:
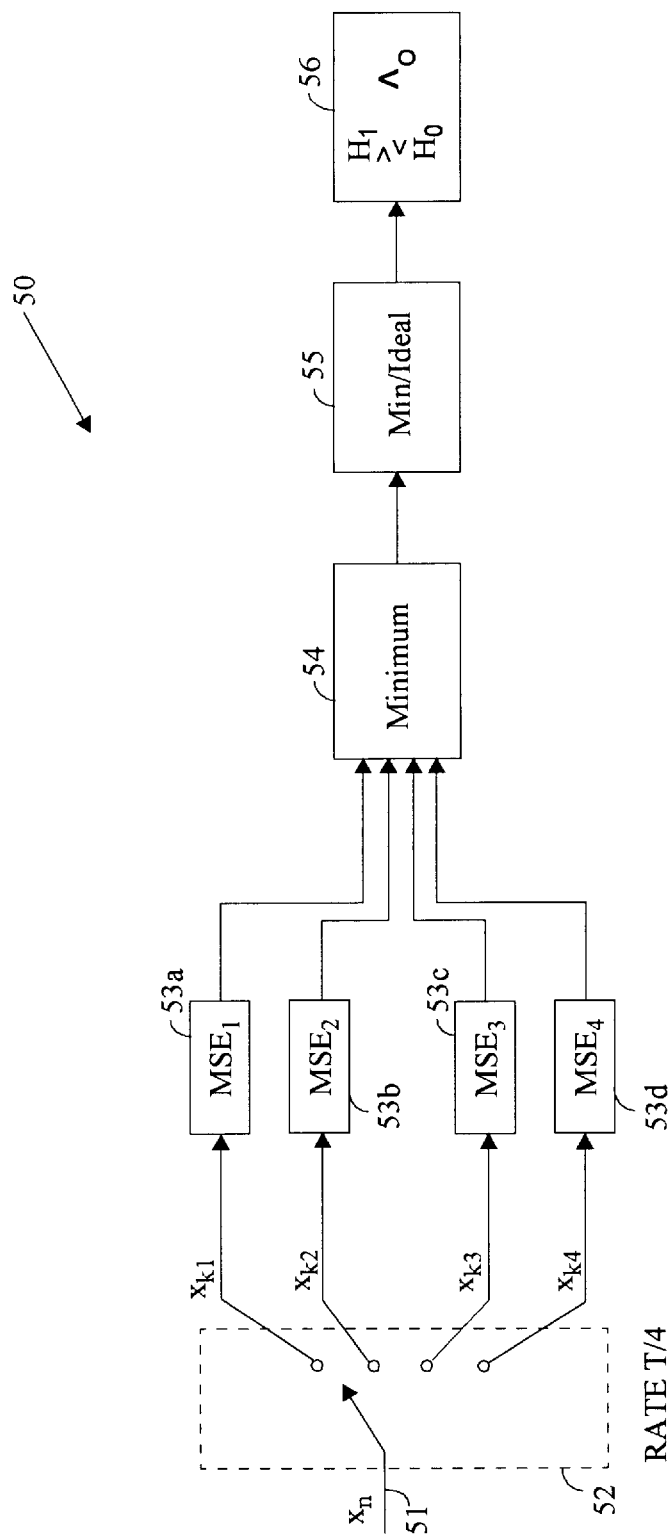
FIG. 7 schematically depicts a processor for identifying IS-136 digital control channel, or DQPSK, signals.
Figure 8:
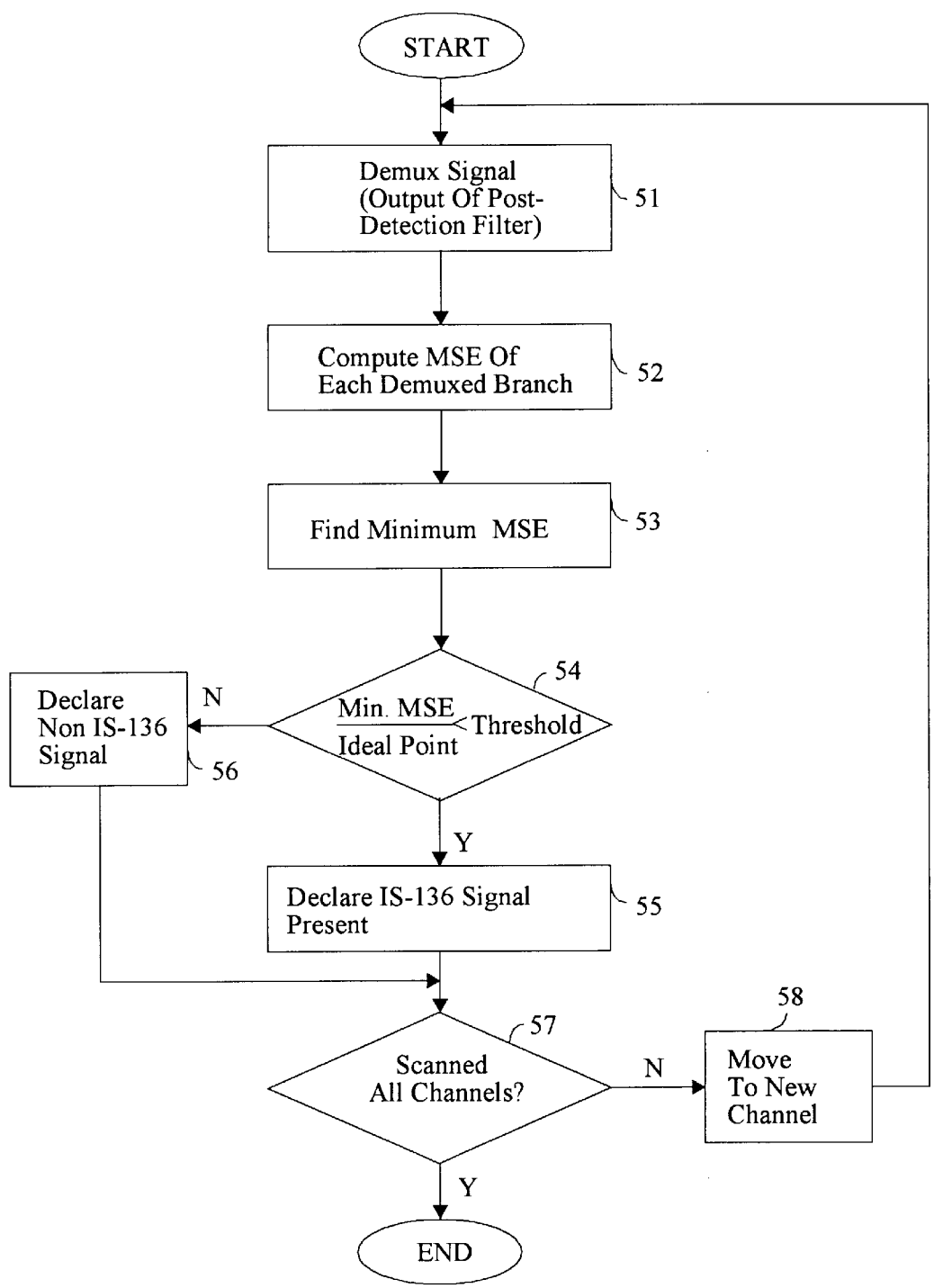
FIG. 8 is a flowchart of the MMSE-DQPSK method.

FIG. 7 schematically depicts a processor for identifying DQPSK signals, and FIG. 8 is a flowchart of the MMSE-DQPSK method. These figures are similar to FIGS. 6C and 6D, respectively, and a comparison of these four figures clearly shows the similarities and differences between the MMSE-CDPD and MMSE-DQPSK methods.

The MMSE-DQPSK method determines whether the received signal has been modulated using the IS-136 digital modulation ($\pi/4$ DQPSK at 24.3 Ksps), or not. As shown in FIG. 7, the signal on line 51 is sampled at four times the symbol rate (4*24.3=97.2 ksamples/second, in the IS-136 case), and is then provided as signal $x_n$ to a demultiplexor 52, which provides four separate sample sequences, $x_{k1}$, $x_{k2}$, $x_{k3}$ and $x_{k4}$. Then, for each sequence $x_{k1}$, $x_{k2}$, $x_{k3}$ and $x_{k4}$ an MSE is computed in blocks 53a–53d, respectively, over a set of symbols. That is, the squared magnitude of the vector difference between the respective sample and an ideal expected signal is averaged over a set of symbols. The number of symbols used to compute each MSE value is selected to optimize performance, given that the best reliability is provided by the largest number of symbols over which the MSE is computed. Of course, the trade-off for high reliability is the longer processing time needed to acquire the samples. If, for example, it is decided that the MSE should be taken over four symbols, say $x_1$, $x_2$, $x_3$, and $x_4$, the four MSE values could be computed as:

$$MSE_1 = \tfrac{1}{4}((x_{11}-x_{ideal})^2 + (x_{21}-x_{ideal})^2 + (x_{31}-x_{ideal})^2 + (x_{41}-x_{ideal})^2)$$

$$MSE_2 = \tfrac{1}{4}((x_{12}-x_{ideal})^2 + (x_{22}-x_{ideal})^2 + (x_{32}-x_{ideal})^2 + (x_{42}-x_{ideal})^2)$$

$$MSE_3 = \tfrac{1}{4}((x_{13}-x_{ideal})^2 + (x_{23}-x_{ideal})^2 + (x_{33}-x_{ideal})^2 + (x_{43}-x_{ideal})^2)$$

$$MSE_4 = \tfrac{1}{4}((x_{14}-x_{ideal})^2 + (x_{24}-x_{ideal})^2 + (x_{34}-x_{ideal})^2 + (x_{44}-x_{ideal})^2)$$

Figure 1A:
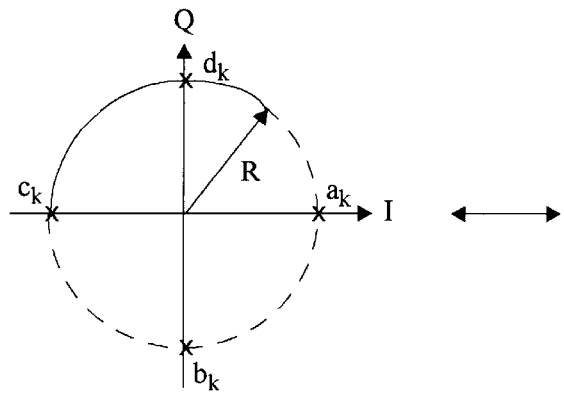
FIGS. 1A and 1B illustrate exemplary DQPSK signals.
Figure 1B:
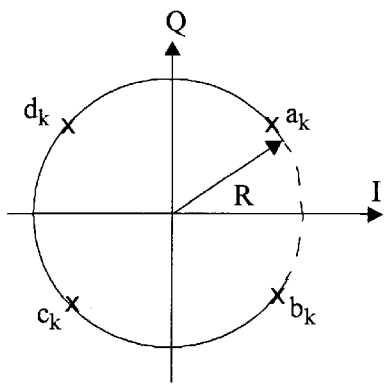
Figure 2:
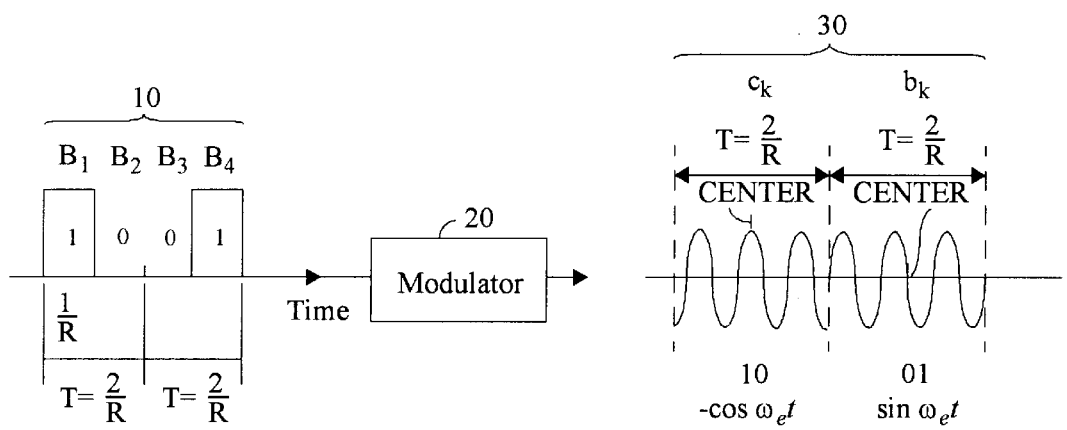
FIG. 2 illustrates the conversion of a four-bit sequence to a sequence of two quaternary symbols by a DQPSK modulator.
Figure 3:
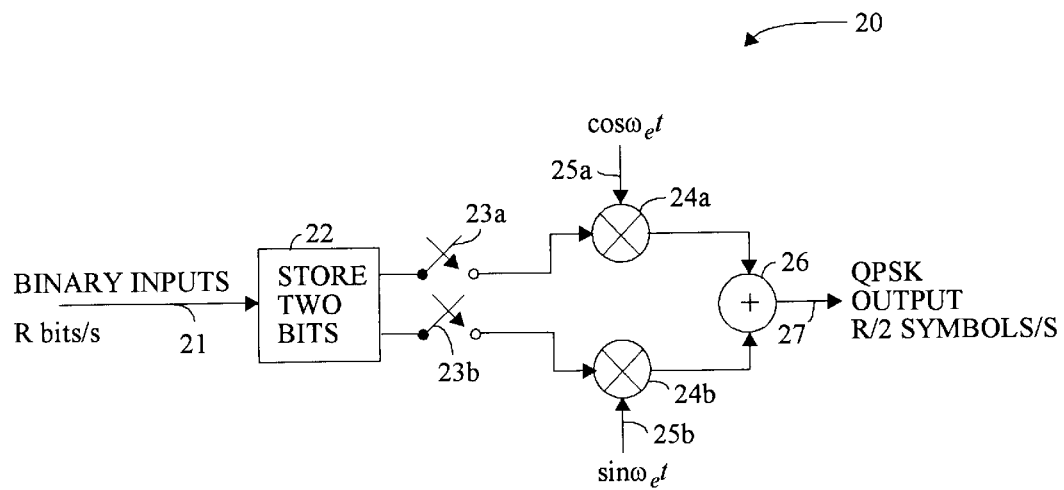
FIG. 3 schematically depicts an exemplary DQPSK modulator.
Figure 4:
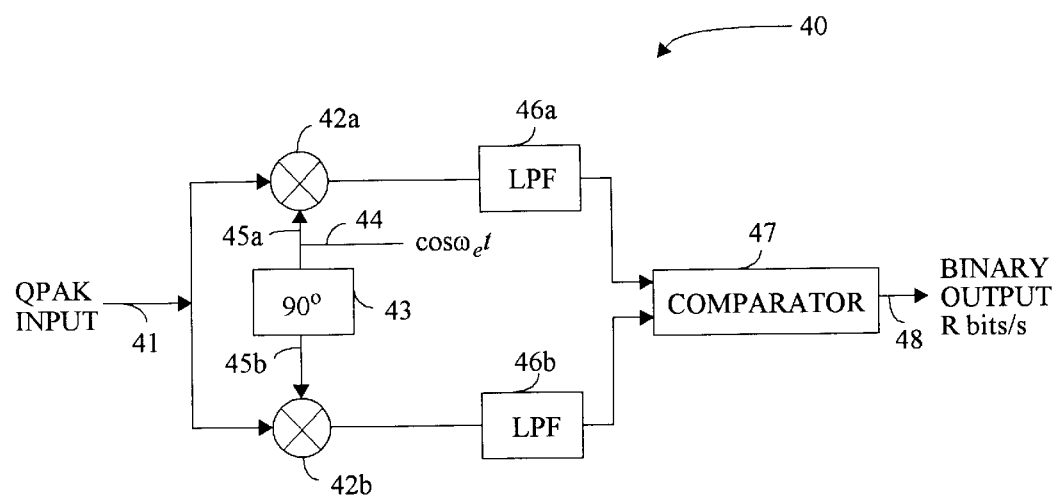
FIG. 4 schematically depicts an exemplary DQPSK demodulator.

In the above equations, $x_{ideal}$ is the ideal value for the given symbol, e.g., 0, j, −1, or −j, or (1√2)((1+j)), (1+j), (−1−j), or (1−j)). The ideal value for a given symbol is determined by choosing the value from the foregoing set of possibilities that is closest to the actual received value. The purpose of using multiple samples ($x_{k1}$, $x_{k2}$, $x_{k3}$, $x_{k4}$) per received symbol $x_k$ is to attempt to obtain a sample at the center of the symbol, i.e., at the hash marks in the exemplary waveforms in FIG. 2.

The minimum of the MSEs over the set of four sequences is then found in block 54, and the ratio of this minimum to the ideal signal value is computed in block 55. This ratio is in effect a Noise-to-Signal Ratio (NSR), i.e., the inverse of the Signal-to-Noise Ratio (SNR). (The term "Noise" is used in a generic sense, and it includes not only receiver and man-made noise, but also other impairments such as interference from other cellular users and signal distortion introduced by imperfect filtering and multipath propagation.) The NSR is then compared, in block 56, to a fixed threshold, and if it is less than the threshold the decision is made that the received signal is of the desired type, i.e., $\pi/4$ DQPSK at 24.3 Ksps.

Otherwise, the system decides that the received signal is of some other type or is simply noise.

In lieu of the computation of the MSE as described above, alternative but similar measures of match of the received signal to the expected signal can be used. For example, if $$S_1 = r_1 e^{j\theta_1} \text{ and}$$

$$S_2 = r_2 e^{j\theta_2}$$

represent the received signal at two consecutive symbol intervals, then $$d = s_1 s^*_2 = r_1 r_2 e^{j(\theta_1 - \theta_2)} = I + jQ$$

is the decision variable normally used in differentially coherent detection of $\pi/4$ DQPSK. Note that, in normal detection, one is interested in the sign of the I and Q components of d, and the magnitude of this variable is of no significance. In this case, however, we are seeking a measure of match between the received signal and the ideal expected signal, and so the magnitude dependency of d must be removed. One way to do that is to take the angle of d and compare it with the ideal angles (e.g., $\pm\pi/4$ and $\pm 3\pi/4$). Another way is to divide $d^2$ by its squared magnitude, i.e., to generate $$d\_sqrd_{norm} = d^2/(r_1 r_2)^2 = I_{norm} + jQ_{norm},$$

which removes the magnitude dependency, and then to form $$Metric = |I_{norm}| + |Q_{norm}| - 1|,$$

and then to compare Metric with a threshold. An ideal match results in Metric equal to zero. Therefore, the smaller Metric is, the better the match.

A good value for the threshold would be one linked to the maximum NSR with which acceptable operation can be achieved. For example, if the minimum SNR is 12 dB, a good threshold number may be 4 times the NSR, or about 0.25.

The preferred metric depends on the capabilities of the implementation, and whether or not a tight control on the received signal magnitude is possible. For example, in a fast fading channel, it is likely that the signal magnitude will vary significantly, even after AGC is applied. In that case, the approach described in detail above or an equivalent one will likely be needed to remove the magnitude dependency.

The presently preferred method for detecting DQPSK, or IS-136 digital control channel, signals will now be summarized with reference FIG. 8. The method begins by demultiplexing the signal output of the post-detection filter 50 (FIG. 5). This step is step S1. Thereafter, the MSE of the samples in each demultiplexer branch (see FIG. 7) is computed (step S2). The minimum MSE is then found (step S3). (Note that steps S1–S3 are similar to steps S1–S3 of the MMSE-CDPD method.) The ratio of the minimum MSE to the ideal value is then compared to a threshold in step S4. If the ratio is not greater than the threshold, the signal is declared a non-DQPSK signal or non-IS-136 signal, in step S6. If the ratio is greater than the threshold, the signal is declared an IS-136 signal, in step S5. Finally, as in the MMSE-CDPD method, all channels are preferably scanned in steps S7 and S8.

C. Similarities/Differences Between CDPD and IS-136 Methods

The MMSE-DQPSK method is quite similar to the MMSE-CDPD method. The problems addressed by the two methods are similar in nature. The CDPD channel does not have an a priori known channel allocation, and upon power-up the subscriber unit is required to scan all the cellular channels in order to determine where the CDPD channel is residing. The same problem arises in the context of the IS-136 specification and as pointed out above it can arise in similar, yet different system designs.

The solutions offered by the two methods are also similar. However, the modulation type of CDPD is different from the one used in the IS-136 specification, and as a result the details of the computations are different. Additionally, the minimum MSE is compared to the average of the largest MSEs in the CDPD method, whereas in the DQPSK method the minimum MSE is compared to the ideal decision point. The present inventors believe that the DQPSK method of making the decision gives better performance results, since the average of the two largest MSEs is in most cases smaller than the ideal point, and as a result the decision variable will be larger and will correspondingly muddy the decision. Additionally, the average of the two largest MSEs is itself a random variable, which can make the decision more noisy.

The present invention may be embodied in other specific forms without departing from the spirit or essential attributes thereof, and, accordingly, reference should be made to the appended claims, rather than to the foregoing specification, as indicating the scope of the invention and the scope of protection of the following claims.

We claim:

1. A method for detecting the presence of a prescribed signal type in a channel of a communications system having a plurality of channels in which the prescribed signal might be present at any given time, the method comprising the steps of:

(a) sampling a received signal in at least one channel to obtain a predetermined number of sampling sequences for said at least one channel;

(b) computing an error value for each sampling sequence, each said error value based on differences, if any, between each sample value of the sampling sequence and a predetermined value;

(c) determining a minimum error value;

(d) comparing a function of the minimum error value to a reference value; and (e) making a decision as to whether the received signal is said prescribed signal on the basis of the comparison.

2. A method as recited in claim 1, wherein said communications system is a cellular system.

3. A method as recited in claim 1, wherein said prescribed signal is a Cellular Digital Packet Data (CDPD) signal.

4. A method as recited in claim 1, wherein said error values are mean-squared error (MSE) values.

5. A method as recited in claim 1, wherein said reference value comprises an average of at least two error values.

6. A method as recited in claim 1, wherein said reference value comprises an ideal expected value.

7. A method as recited in claim 1, wherein said communications system is a cellular system, said prescribed signal is a Cellular Digital Packet Data (CDPD) signal, said error values are mean-squared error (MSE) values, and said reference value comprises an average of at least two error values.

8. A method for detecting the presence of a prescribed signal type in a channel of a communications system having a plurality of channels in which the prescribed signal might be present at any given time, the method comprising the steps of:

(a) sampling a received signal in at least one channel to obtain a predetermined number of sampling sequences for said at least one channel;

(b) computing an error value for each sampling sequence, each said error value based on differences, if any, between each sample value of the sampling sequence and a predetermined value;

(c) determining a minimum error value;

(d) comparing a function of the minimum error value to a reference value; and (e) making a decision as to whether the received signal is said prescribed signal on the basis of the comparison, wherein said prescribed signal is a DQPSK signal.

9. A method as recited in claim 8, wherein said prescribed signal is a π/4 DQPSK signal.

10. A method as recited in claim 8, wherein said error values are mean-squared error (MSE) values.

11. A method as recited in claim 10, wherein a first of said MSE values ($MSE_1$) is computed over a plurality of symbols with respect to a first sample of each of said symbols, and a second of said MSE values ($MSE_2$) is computed over said plurality of symbols with respect to a second sample of each of said symbols.

12. A method as recited in claim 11, wherein a third of said MSE values ($MSE_3$) is computed over said plurality of symbols with respect to a third sample of each of said symbols, and a fourth of said MSE values ($MSE_4$) is computed over said plurality of symbols with respect to a fourth sample of each of said symbols.

13. A method for detecting the presence of a prescribed signal type in a channel of a communications system having a plurality of channels in which the prescribed signal might be present at any given time, the method comprising the steps of:

(a) sampling a received signal in at least one channel to obtain a predetermined number of sampling sequences for said at least one channel;

(b) computing an error value for each sampling sequence, each said error value based on differences, if any, between each sample value of the sampling sequence and a predetermined value;

(c) determining a minimum error value;

(d) comparing a function of the minimum error value to a reference value; and (e) making a decision as to whether the received signal is said prescribed signal on the basis of the comparison, wherein said prescribed signal is a DQPSK signal; wherein said error values are mean-squared error (MSE) values; and wherein a first of said MSE values ($MSE_1$) is computed over a plurality of symbols with respect to a first sample of each of said symbols, a second of said MSE values ($MSE_2$) is computed over said plurality of symbols with respect to a second sample of each of said symbols, a third of said MSE values ($MSE_3$) is computed over said plurality of symbols with respect to a third sample of each of said symbols, and a fourth of said MSE values ($MSE_4$) is computed over said plurality of symbols with respect to a fourth sample of each of said symbols.

14. A system for detecting the presence of a prescribed signal type in a channel of a communications system having a plurality of channels in which the prescribed signal might be present at any given time, the system comprising:

(a) means for sampling a received signal in at least one channel to obtain a predetermined number of sampling sequences for said at least one channel;

(b) means for computing an error value for each sampling sequence, each said error value based on differences, if any, between each sample value of the sampling sequence and a predetermined value;

(c) means for determining a minimum error value;

(d) means for comparing a function of the minimum error value to a reference value; and (e) means for making a decision as to whether the received signal is said prescribed signal on the basis of the comparison.

15. A system as recited in claim 14, wherein said communications system is a cellular system.

16. A system as recited in claim 14, wherein said prescribed signal is a Cellular Digital Packet Data (CDPD) signal.

17. A system as recited in claim 14, wherein said error values are mean-squared error (MSE) values.

18. A system as recited in claim 14, wherein said reference value comprises an average of at least two error values.

19. A system as recited in claim 14, wherein said communications system is a cellular system, said prescribed signal is a Cellular Digital Packet Data (CDPD) signal, said error values are mean-squared error (MSE) values, and said reference value comprises an average of at least two error values.

20. A system for detecting the presence of a prescribed signal type in a channel of a communications system having a plurality of channels in which the prescribed signal might be present at any given time, the system comprising:

(a) means for sampling a received signal in at least one channel to obtain a predetermined number of sampling sequences for said at least one channel;

(b) means for computing an error value for each sampling sequence, each said error value based on differences, if any, between each sample value of the sampling sequence and a predetermined value;

(c) means for determining a minimum error value;

(d) means for comparing a function of the minimum error value to a reference value; and (e) means for making a decision as to whether the received signal is said prescribed signal on the basis of the comparison, wherein said prescribed signal is a DQPSK signal.

21. A system as recited in claim 20, wherein said prescribed signal is a π/4 DQPSK signal.

22. A system as recited in claim 20, wherein said error values are mean-squared error (MSE) values.

23. A system as recited in claim 22, wherein a first of said MSE values ($MSE_1$) is computed over a plurality of symbols with respect to a first sample of each of said symbols, and a second of said MSE values ($MSE_2$) is computed over said plurality of symbols with respect to a second sample of each of said symbols.

24. A system as recited in claim 23, wherein a third of said MSE values ($MSE_3$) is computed over said plurality of symbols with respect to a third sample of each of said symbols, and a fourth of said MSE values ($MSE_4$) is computed over said plurality of symbols with respect to a fourth sample of each of said symbols.

25. A system for detecting the presence of a prescribed signal type in a channel of a communications system having a plurality of channels in which the prescribed signal might be present at any given time, the system comprising:

(a) means for sampling a received signal in at least one channel to obtain a predetermined number of sampling sequences for said at least one channel;

(b) means for computing an error value for each sampling sequence, each said error value based on differences, if any, between each sample value of the sampling sequence and a predetermined value;

(c) means for determining a minimum error value;

(d) means for comparing a function of the minimum error value to a reference value; and (e) means for making a decision as to whether the received signal is said prescribed signal on the basis of the comparison, wherein said prescribed signal is a DQPSK signal; wherein said error values are mean-squared error (MSE) values; and wherein a first of said MSE values ($MSE_1$) is computed over a plurality of symbols with respect to a first sample of each of said symbols, a second of said MSE values ($MSE_2$) is computed over said plurality of symbols with respect to a second sample of each of said symbols, a third of said MSE values ($MSE_3$) is computed over said plurality of symbols with respect to a third sample of each of said symbols, and a fourth of said MSE values ($MSE_4$) is computed over said plurality of symbols with respect to a fourth sample of each of said symbols.

26. A mobile cellular subscriber unit, comprising:

an identification block for detecting or identifying an IS-136 digital channel carrying DQPSK signals, said identification block comprising means for (a) obtaining a predetermined number of samples of a received signal in at least one channel, (b) estimating, on the basis of said samples, a match parameter indicative of a Noise-to-Signal (NSR) ratio, and (c) making a decision as to whether said received signal is a DQPSK signal on the basis of said NSR.

27. A mobile cellular subscriber unit as recited in claim 26, and wherein said means includes means for: computing an error value for each sample, said error value based on a difference, if any, between a sample value and a predetermined value; determining a minimum error value; determining a ratio of said minimum error value to a reference value; and making a decision as to whether the received signal is a DQPSK signal on the basis of at least said ratio, wherein said decision is made by comparing said ratio to a threshold value.

28. A mobile cellular subscriber unit as recited in claim 27, wherein said error values are mean-squared error (MSE) values.

29. A mobile cellular subscriber unit as recited in claim 28, wherein a first of said MSE values ($MSE_1$) is computed over a plurality of symbols with respect to a first sample of each of said symbols, and a second of said MSE values ($MSE_2$) is computed over said plurality of symbols with respect to a second sample of each of said symbols.

30. A mobile cellular subscriber unit as recited in claim 29, wherein a third of said MSE values ($MSE_3$) is computed over said plurality of symbols with respect to a third sample of each of said symbols, and a fourth of said MSE values ($MSE_4$) is computed over said plurality of symbols with respect to a fourth sample of each of said symbols.

* * * * *